March 29, 1960 J. R. HALL 2,930,851

PULSE DISTRIBUTOR

Filed March 23, 1954

INVENTOR.
James R. Hall
BY
Charles H. Brown
ATTORNEY

United States Patent Office 2,930,851

Patented Mar. 29, 1960

2,930,851

PULSE DISTRIBUTOR

James R. Hall, Haddonfield, N.J., assignor to Radio Corporation of America, a corporation of Delaware Application March 23, 1954, Serial No. 418,164

7 Claims. (Cl. 179—15)

This invention relates to pulse distributors, and more particularly to means for generating a plurality of pulses on separate leads for successively gating an equal plurality of gated amplifiers.

This invention is particularly useful in an electronic commutator of a time division multiplex system where a continuous intelligence signal is divided up into successive samples directed along separate paths. In a time division multiplex communication system, this process is performed at a receiving terminal to separate a received pulse train wave into the several separate message signals. In a system for recording video signals on magnetic tape, this process is performed to separate the video signal into several narrow band signals each of which is applied to a separate magnetic recording head.

An electronic commutator is also used to recombine a plurality of separate signals into a single composite signal. In a time division multiplex communication system, this process is performed at a transmitting terminal to successively sample a plurality of message signals and combine the samples into a pulse train wave for transmission. In a system for recording video signals on magnetic tape, this process is performed to successively sample the outputs of a plurality of reading heads and to combine them into a complete video signal.

It is an object of this invention to provide an improved pulse distributor of simplified construction.

It is another object to provide an improved pulse distributor which is particularly advantageous at very high repetition rates.

It is a further object to provide an improved electronic commutator system.

In one aspect, the invention comprises a chain of $n$ vacuum tubes each having a resistance-capacitance-inductance ringing circuit connected to the plate electrode of the tube. The plate of each tube is coupled to the grid of the succeeding tube. A separate output is obtained from the plate of each tube. A positive pulse wave is applied to the grid of the first tube in the chain and each positive pulse causes a negative half cycle of voltage on the plate of the tube, followed by a positive half cycle. This positive half cycle is applied to the grid of the following tube to cause on its plate a negative half cycle, followed by a positive half cycle of voltage. The positive half cycle on the plate of the second tube occurs a half cycle later than the positive half cycle on the plate of the first tube. Each tube provides on its plate a positive half cycle which occurs a half cycle later than the positive half cycle on the plate of the preceding tube. The period of one cycle on the plates of the tubes is determined by the resonant frequency of the identical ringing circuits. The ringing circuits include resistance so that the circuits have a Q in the order of one, so that the oscillations are substantially damped out after one cycle of ringing. The period of the ringing circuits is equal to twice the period of the input pulse wave divided by the number of tubes in the chain, i.e., the number of successive output pulses on separate leads desired during one period of the input pulse wave.

These and other objects and aspects of the invention will appear from a reading of the following detailed description taken in conjunction with the appended drawings, wherein.

Figures 1, 2, 3:
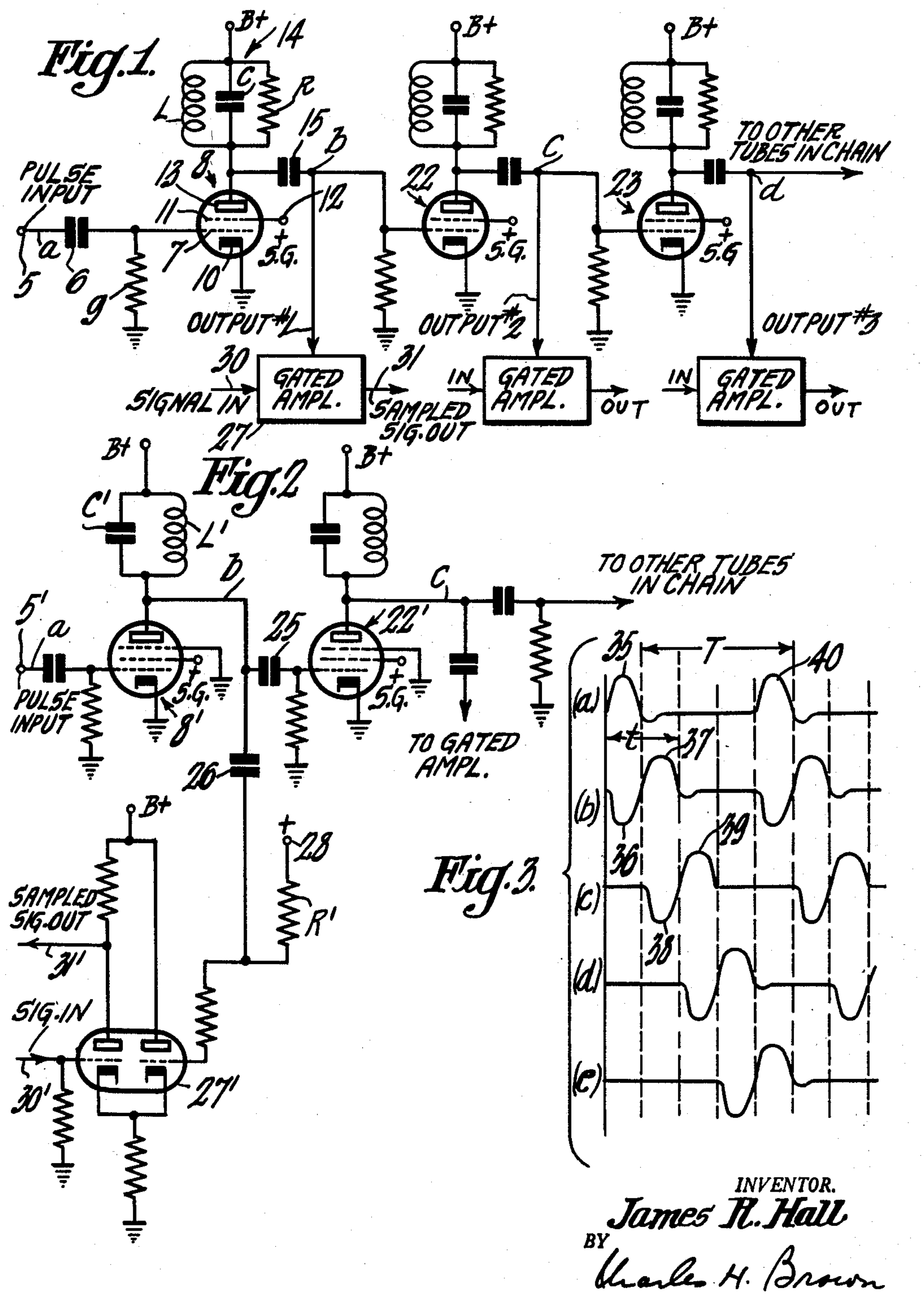
Figure 1 is a circuit diagram of a pulse distributor constructed according to the teachings of this invention.
Figure 2 is a circuit diagram of the modified form of the invention.
Figure 3 is a chart of voltage waveforms, appearing at identified points in the circuits of Figures 1 and 2, which will be used in explaning the operation of the circuits.

Figure 1 shows a pulse distributor including a chain of vacuum tubes, three of which are shown in the drawing. A pulse input terminal 5 is connected thru a coupling capacitor 6 to the grid 7 of a first vacuum tube 8. The gride 7 is conected thru a grid resistor 9 to ground. The cathode 10 is connected to ground. The screen grid 11 is connected to the positive terminal 12 of a source of unidirectional potential referenced to ground. The plate 13 of the vacuum tube 8 is connected thru a ringing circuit generally designated 14 to the B+ terminal of a cource of unidirectional potential referenced to ground. The ringing circuit 14 includes, in parallel, a resistor R, a capacitor C and an inductor L. The plate 13 is coupled thru a coupling capacitor 15 to the output lead $b$, and to the control grid of the second vacuum tube 22 in the chain.

The circuit of vacuum tube 22 is the same as the circuit of vacuum tube 8, and it has an output coupled to an output lead $c$ and the grid of a third vacuum tube 23. The circuit of vacuum tube 23 is the same as the circuits of vacuum tubes 8 and 22 and has an output lead $d$. Any desired number of vacuum tubes may be included in the chain, the number of vacuum tubes in the system will be referred to as the number $n$. There are as many outputs as there are tubes in the chain, each output being applied to a separate gated amplifier 27.

Figure 2 shows a modified form of the invention wherein the vacuum tubes in the chain are pentodes. An input terminal 5′ is coupled to the control grid of the first vacuum tube 8′ in the chain. The plate of tube 8′ is connected to the B+ terminal thru a parallel resonant circuit including a capacitor C′ and an inductor L′. The plate of the vacuum tube 8′ is coupled over an output lead $b$, thru a coupling capacitor 25 to the control grid of the second vacuum tube 22′, and thru a coupling capacitor 26 to the control grid of a duo-triode gated vacuum tube amplifier 27′, and thru a resistor R′ to the positive terminal 28 of a source of unidirectional bias potential for the gated amplifier 27′. Resistor R′ is effectively in circuit with the capacitor C′ and inductor L′ so far as radio frequency energy is concerned.

The gated amplifier tube 27′ is a conventional circuit including a signal input terminal 30′ and a sampled signal output terminal 31′. The output of the second vacuum tube 22′ in the chain is coupled over lead $c$ to a second gated amplifier (not shown) similar to gated amplifier 27′. The output of each vacuum tube in the chain is coupled to a similar gated amplifier. Depending on the mode of operation (whether the system is a receiving terminal or a transmitting terminal of a multiplex arrangement) all of the signal input terminals of the gated amplifiers may be connected together, or all of the sampled signal output terminals of the gated amplifiers may be connected together.

The operation of the circuits of Figures 1 and 2 will now be described with reference to the voltage waveforms shown in Figure 3. The voltage waveforms of Figure 3 are drawn on the assumption that there are four vacuum tube circuits in the chain to provide four successive separate output pulse waves during one period of the input pulse wave. The waveforms of Figure 3 are equally applicable to the circuits of Figures 1 and 2.

Waveform *a* of Figure 3 represents the input pulse wave applied to input terminal 5 or 5'. The positive input pulse 35 (waveform *a*) coupled to the grid of the first tube 8 or 8' in the chain causes a negative wave 36 to appear at the plate of the tube, as shown by the waveform *b* of Figure 3. The energy stored in the ringing circuit then causes a positive half cycle 37 to appear at the plate of the tube. The duration of the positive half cycle 37 is determined by the resonant frequency of the ringing circuit. The ringing circuit 14 or L' C' R' has a resonant frequency such that the period of one complete sine wave oscillation is as represented by *t* in the drawing. The damping resistor R or R' in the ringing circuit has a value such that the oscillation is substantially completely damped out following the positive half cycle.

The positive half cycle 37 in the output of the first tube is applied to the grid of the second tube 22 or 22' causing the negative voltage wave 38, followed by the positive half cycle 39, to appear on the plate of the second tube, as shown by waveform *c* of Figure 3. It will be noted that the positive half cycle 39 occurs a half cycle later than the positive half cycle 37 in the output of the first tube. It is apparent that following the application of a positive pulse to the input terminal 5, positive half cycles successively appear on the plates of the successive vacuum tubes in the chain, the positive half cycles in each tube being delayed a half cycle at the frequency to which the ringing circuits are tuned.

After positive half cycles have been generated on the plates of all four of the tubes in the chain, as represented by the waveforms *b* thru *e*, a second input pulse 40 is applied to the pulse input terminal of the first tube. The cycle of operation is then repeated. The period between pulses of the input pulse wave *a* is represented by T. The resonant frequency of the ringing circuit is such that the period *t* bears a relationship with the period of the input pulse wave T which depends on the number *n* of vacuum tubes in the chain. This relationship may be expressed as follows:

$$t=\frac{2T}{n}$$

that is, the period of the ringing circuits equals two times the period of the input pulse wave divided by the number *n* of vacuum tubes in the chain. In the illustration wherein there are four vacuum tubes in the chain, the time T is divided into four equal units, and each of the four tubes in the chain provides a positive pulse output during respective ones of the four time periods.

The proper operation of the invention depends upon the presence of the resistor R in each of the ringing circuits. The value of the resistor R is selected to provide a Q in the order of one for the ringing circuits so that the ringing circuits are allowed to ring for substantially only a half cycle following the application thereto of the energizing impulse.

The positive half cycles in the output of each of the tubes in the chain is applied to a separate respective gated amplifier, 27 or 27' one of which is shown in detail in Figure 2. The gated amplifier 27 or 27' operates to sample a portion of the input signal which is present at terminal 30 or 30' at the time of the positive half cycle from the ringing circuit. The sample appears at the sample signal output terminal 31 or 31'. In the arrangement shown in Figure 2, the resistor R' serves as a damping resistor included in the ringing circuit, and in addition, as part of a voltage divider by which a positive biasing potential is applied to one of the grids of the gated amplifier device.

The invention provides a simple and effective circuit for generating a plurality of successively occurring gating pulses for use in an electronic commutator.

What is claimed is:

1. In a time division multiplex system, an electronic commutator comprising, a chain of *n* vacuum tube circuits each including grid and plate electrodes, a separate resistance-capacitance-inductance ringing circuit connected to the plate of each of said tubes, said ringing circuits being all tuned to the same frequency and including a resistor having a value such as to provide a Q in the order of one, means coupling the plate of each tube to the grid of the following tube in the chain, means to apply a pulse wave only to the grid of the first of said tubes in the chain, said ringing circuits being tuned to have a period equal to two times the period of said input pulse wave divided by *n*, and means to derive *n* separate outputs from the plates of said *n* tubes; in combination with gates individually coupled to and controlled by the outputs from said tubes, and a separate signal input circuit coupled to each of said gates, whereby the outputs from said gates are samples of the signals applied to said signal input circuits.

2. In a time division multiplex system, an electronic commutator comprising, a chain of *n* current conducting devices each including at least an input and output electrode, a separate resistance-capacitance-inductance ringing circuit coupled to the output electrode of each of said devices, said ringing circuits being all tuned to the same frequency and including a resistor having a value such as to provide a Q in the order of one, means coupling the output electrode of each device to the input electrode of the following device in said chain, means to apply a pulse wave only to the input electrode of the first of said devices in said chain, said ringing circuits being tuned to have a period equal to two times the period of said input pulse wave divided by *n*, and means to derive *n* separate outputs from the output electrodes of said *n* devices; in combination with gates individually coupled to and controlled by the outputs from said devices, and a separate signal input circuit coupled to each of said gates, whereby the outputs from said gates are samples of the signals applied to said signal input circuits.

3. An electronic commutator comprising, a chain of *n* vacuum tube circuits each including grid and plate electrodes, a separate resistance-capacitance-inductance ringing circuit coupled to the plate of each of said tubes and including a resistance having a value such as to provide a Q in the order of one, means coupling the plate of each tube to the grid of the following tube in said chain, means to apply an input pulse wave only to the grid of the first tube in said chain, said ringing circuits being all tuned to the same frequency and to have a period equal to two times the period of said input pulse wave divided by *n*, and a plurality of gating circuits individually coupled to said ringing circuits for operation in time sequence in response to the output pulses sequentially produced by said ringing circuits.

4. An electronic commutator as claimed in claim 3 and wherein said ringing circuits each include an inductor, a capacitor and a resistor connected in parallel.

5. An electronic commutator comprising, a chain of *n* vacuum tube circuits each including a plate and control grid, means coupling the plate of each tube to the grid of the following tube in said chain, a separate ringing circuit having a Q in the order of one coupled to the plate of each of said tubes, said ringing circuits each including an inductor and a capacitor connected in parallel between the positive terminal of a source of unidirectional potential and the plate of the corresponding tube and also including a resistor connected on one side to the positive terminal of a source of unidirectional potential with the other side of said resistor coupled through a coupling capacitor to the plate of the corresponding tube, means to apply an input pulse wave only to the grid of the first tube in said chain, said ringing circuits being tuned to have a period equal to two times the period of the input pulse wave divided by *n*, and *n* gating circuits individually coupled to said other side of said resistors for operation in time sequence in response to the output pulses sequentially produced by said ringing circuits.

6. An electronic commutator as claimed in claim 5, each of said vacuum tube circuits further including a screen grid connected to the positive terminal of a source of unidirectional potential, and a cathode connected to a point of reference potential.

7. An electronic commutator as claimed in claim 5, each of said vacuum tube circuits further including a screen grid connected to the positive terminal of a source of unidirectional potential, a grid connected to a point of reference potential, and a cathode connected to said point of reference potential.

References Cited in the file of this patent

UNITED STATES PATENTS

| | | |
|---|---|---|
| 2,401,807 | Wolff | June 11, 1946 |
| 2,402,916 | Schroeder | June 25, 1946 |
| 2,418,375 | Tourshou | Apr. 1, 1947 |
| 2,543,736 | Trevor | Feb. 27, 1951 |
| 2,594,336 | Mohr | Apr. 29, 1952 |
| 2,680,153 | Boothroyd et al. | June 1, 1954 |
| 2,876,058 | Kenosian et al. | Mar. 3, 1959 |